US00RE45018E

(19) United States
(12) Reissued Patent
Yi et al.

(10) Patent Number: US RE45,018 E
(45) Date of Reissued Patent: *Jul. 15, 2014

(54) ELECTRICAL CONNECTOR WITH IMPROVED CONTACTS

(75) Inventors: Chong Yi, Mechanicsburg, PA (US); Kuan-Yu Chen, Hillsboro, OR (US)

(73) Assignee: Hon Hai Precision Ind. Co., Ltd., Tai Pei, Hsien (TW)

( * ) Notice: This patent is subject to a terminal disclaimer.

(21) Appl. No.: 13/292,664

(22) Filed: Nov. 9, 2011

Related U.S. Patent Documents

Reissue of:

(64) Patent No.: 7,614,887
Issued: Nov. 10, 2009
Appl. No.: 12/221,314
Filed: Jul. 31, 2008

(51) Int. Cl.
*H05K 1/00* (2006.01)

(52) U.S. Cl.
USPC ..... 439/79; 439/577

(58) Field of Classification Search
USPC ..... 439/79, 92, 577, 607.4, 620.12, 701
See application file for complete search history.

(56) References Cited

U.S. PATENT DOCUMENTS

| | | | | |
|---|---|---|---|---|
| 5,725,386 | A | 3/1998 | Davis et al. | |
| 5,769,666 | A | 6/1998 | Wu | |
| 5,779,489 | A | 7/1998 | Davis et al. | |
| 5,975,958 | A | 11/1999 | Weidler | |
| 7,699,663 | B1 * | 4/2010 | Little et al. | 439/660 |
| 7,883,371 | B1 * | 2/2011 | Chen et al. | 439/607.41 |
| 8,021,195 | B2 * | 9/2011 | He et al. | 439/638 |

FOREIGN PATENT DOCUMENTS

| | | |
|---|---|---|
| JP | 10125371 | 5/1998 |
| JP | 11167947 | 6/1999 |
| JP | 2007059351 | 3/2007 |
| JP | 3134262 U | 5/2007 |
| WO | 0016449 | 3/2000 |

* cited by examiner

*Primary Examiner* — Khiem Nguyen
(74) *Attorney, Agent, or Firm* — Andrus Intellectual Property Law, LLP

(57) ABSTRACT

An electrical connector includes a housing member and a number of contacts attached to the housing member. The contacts include a number of first contacts and second contacts arranged side by side along a transverse direction, respectively. Each of the first and second contacts include a main portion, a contact portion and a bending portion extending from a lateral edge of the main portion. The bending portion has a narrow width in order to occupy small space of a rear wall of the housing member so that the rear wall of the housing member still has adequate area for mounting other components.

32 Claims, 15 Drawing Sheets

ELECTRICAL CONNECTOR WITH IMPROVED CONTACTS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to electrical connectors, more particularly to electrical connectors with improved contacts to be soldered to a printed circuit board (PCB).

2. Description of Related Art

U.S. Pat. No. 5,769,666 discloses an electrical connector including an insulative housing, a plurality of contacts retained in the housing and a metal shield received in the housing. The contacts include contact portions and bending portions extending downwardly from rear ends of the contact portions. The bending portions are perpendicular to the contact portions and include contractive tail portions for being soldered to a PCB. The metal shield encloses the contact portions for EMI protection. The bending portions directly extend downwardly from the rear ends of the contact portions. The bending portions occupy much area of a rear wall of the housing because a width of the bending portion viewed from a rear-to-front direction is much larger than that viewed from left-to-right direction. As a result, the rear wall of the housing doesn't have reasonable area for mounting components.

Hence, an improved electrical connector is desired to overcome the above problems.

BRIEF SUMMARY OF THE INVENTION

An electrical connector includes a housing member and a plurality of contacts attached to the housing member. The contacts include a plurality of first contacts arranged side by side along a transverse direction, and a plurality of second contacts arranged side by side along the transverse direction as well. Each first contact comprises a first main portion, a first contact portion and a first betiding portion extending from a lateral edge of the first main portion. The first bending portion is substantially perpendicular to the first main portion. Each second contact comprises a second main portion, a second contact portion and a second bending portion extending from a lateral edge of the second main portion. The second bending portion is substantially perpendicular to the second main portion and is parallel to the first bending portion. The first and the second contact portions are located at a same side of the housing member. Each of the second bending portion comprises a first width viewed from a left-to-right direction parallel to the transverse direction, and a second width viewed from a rear-to-front direction perpendicular to the transverse direction in condition that the second width is narrower than the first width. As a result, the narrow second width of the second bending portions can occupy small space of a rear wall of the housing member so that the rear wall of the housing member still has adequate area for mounting other components.

The foregoing has outlined-rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
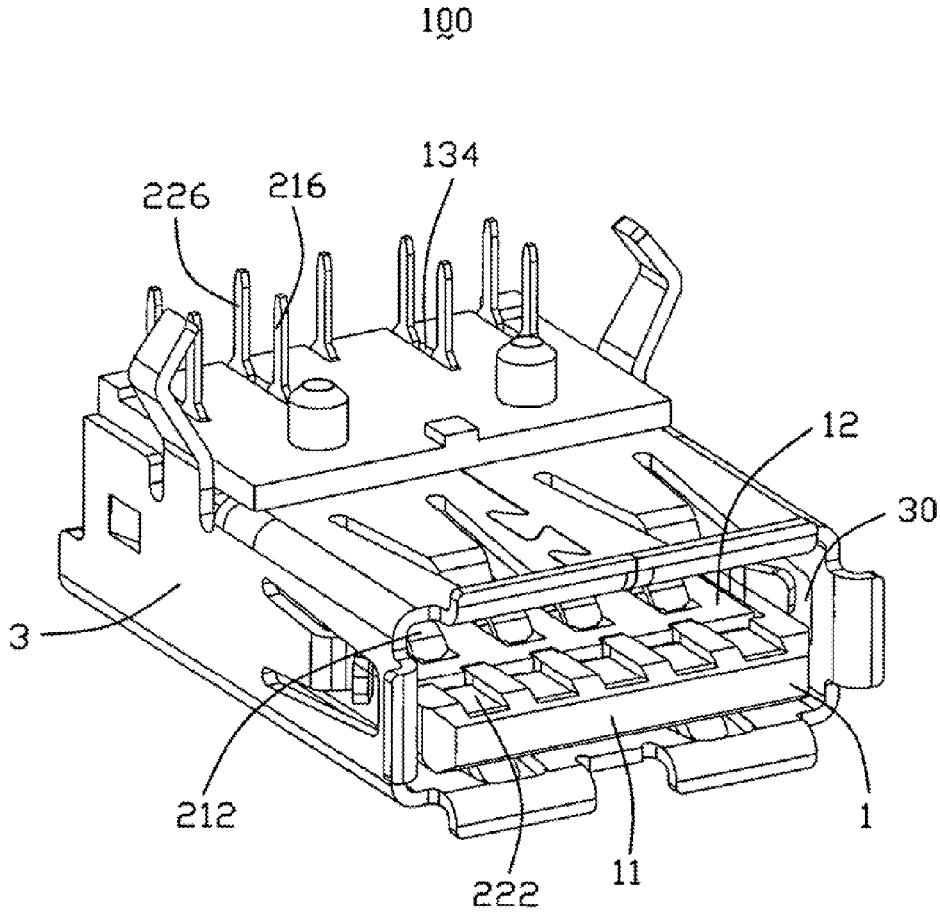
FIG. 1 is a perspective view of an electrical connector according to a first preferred embodiment of the present invention.
Figure 2:
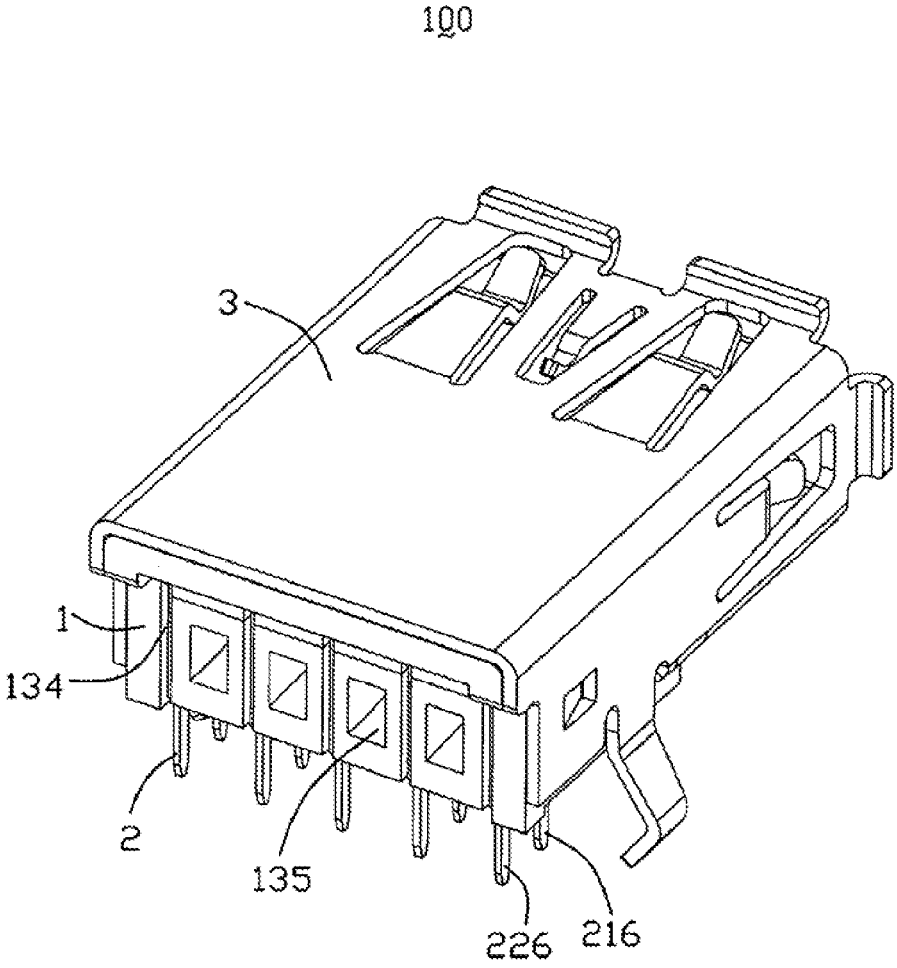
FIG. 2 is a perspective view of the electrical connector shown in FIG. 1, while taken from another aspect.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Reference will be made to the drawing figures to describe the present invention in detail, wherein depicted elements are not necessarily shown to scale and wherein like or similar elements are designated by same or similar reference numeral through the several views and same or similar terminology.

Referring to FIGS. 1-5, an electrical connector 100 to be mounted on a PCB (not shown) includes a housing member 1, a plurality of contacts 2 attached to the housing member 1 and a metal shield 3 enclosing the housing member 1. The housing member 1 includes a first insulative housing 11 and a second insulative housing 12 received in the first insulative housing 11. The separate first and second insulative housings 11, 12 can facilitate assembly of the contacts 2 which will be detailed hereinafter.

Figure 6:
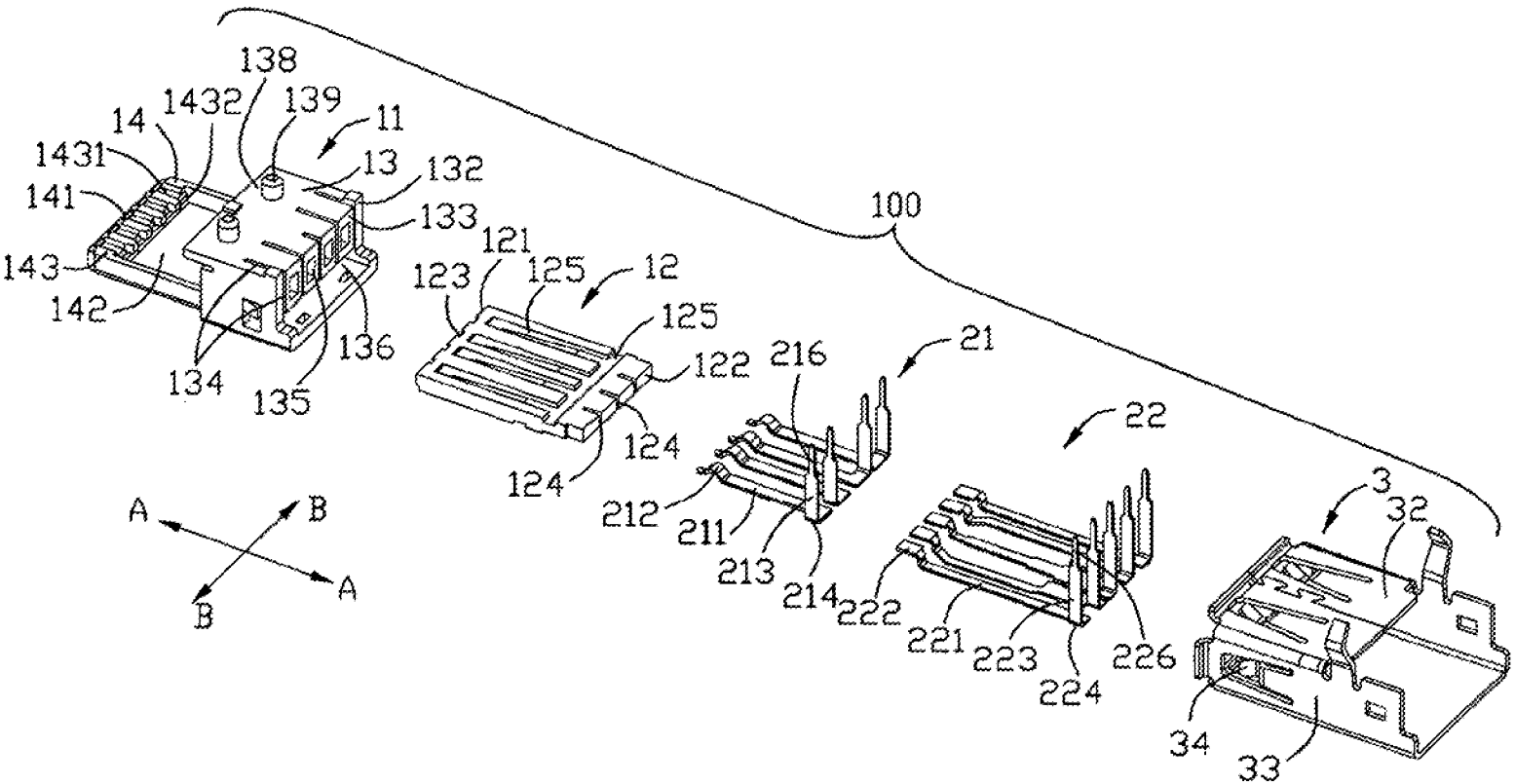
FIG. 6 is an exploded perspective view of the electrical connector shown in FIG. 1.
Figure 7:
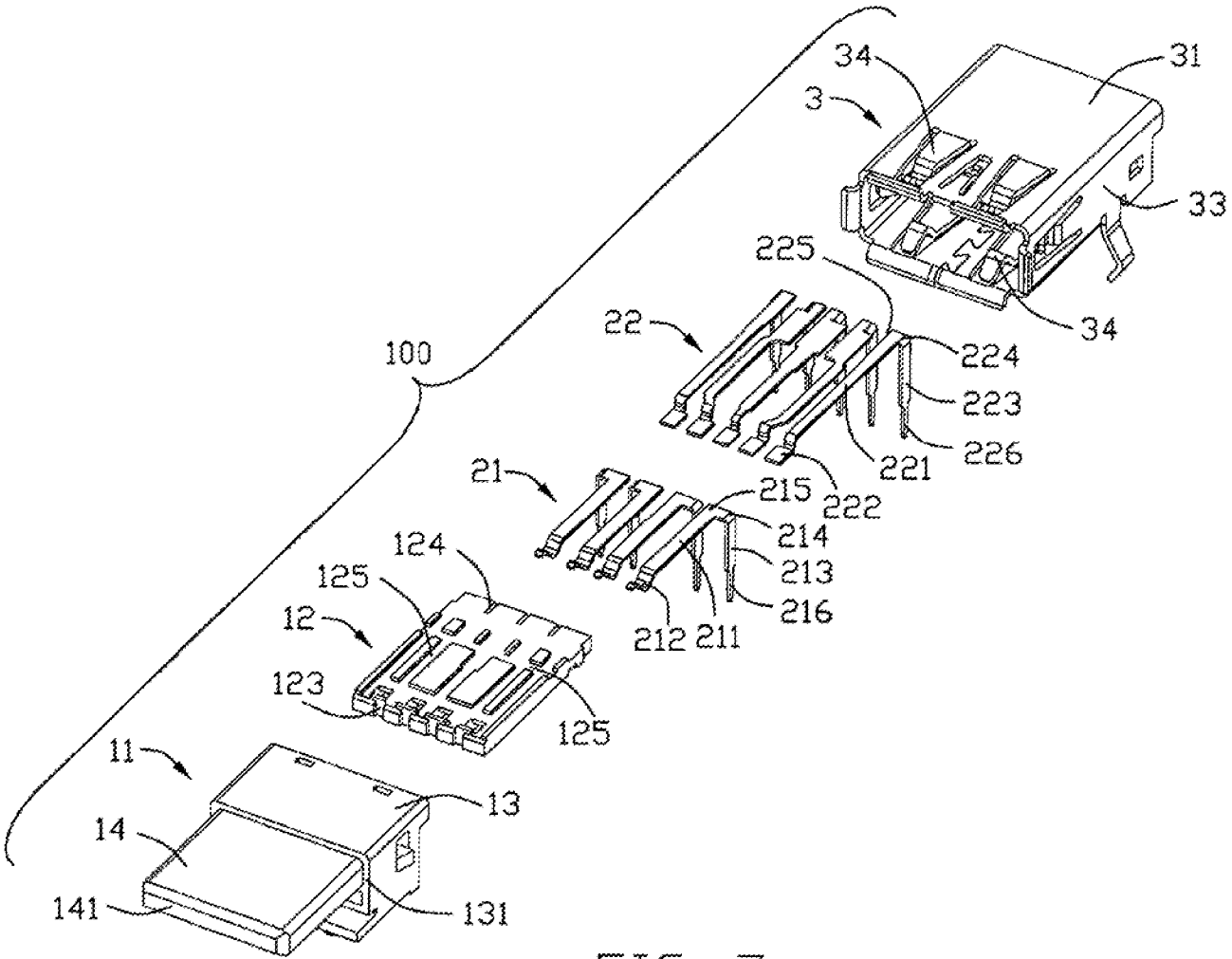
FIG. 7 is another exploded perspective view of the electrical connector shown in FIG. 6, but taken from another aspect.

Referring to FIGS. 6 and 7, the first insulative housing 11 includes a base portion 13 and a tongue plate 14 extending forwardly from a front face 131 of the base portion 13. The tongue plate 14 extends along a longitudinal direction A-A of the electrical connector 100 as shown in FIG. 6. The base portion 13 includes a bottom mounting wall 138 and a rear side 132 opposite to the front face 131. The mounting wall 138 includes a pair of mounting posts 139 extending outwardly therefrom and to be received in corresponding through holes (not shown) defined in the PCB so that the electrical connector 100 can be firmly mounted on the PCB. The rear side 132 of the base 13 includes a rear face 133 with five parallel first slits 134 recessed therefrom. Each first slit 134 extends along the longitudinal direction A-A, while all the first slits 134 are arranged side by side along a transverse direction B-B which is perpendicular to the longitudinal direction A-A as shown in FIG. 6. The rear side 132 of the base portion 13 further includes a plurality of through holes 135 located between the adjacent two first slits 134. The through holes 135 are rectangular shaped and extend along the longitudinal direction A-A. The through holes 135 extend through the front and the rear faces 131, 133 for receiving a fiber optic device (not shown in this embodiment, but will be detailed in other embodiments) in order to enhance high speed signal transmission of the electrical connector 100. The fiber optic device includes a plurality of fiber cables. In assembly, the fiber cables are electrically connected to the PCB for mating with corresponding another fiber optic of the plug which is mateable with the electrical connector 100. The base 13 includes a rectangular shaped receiving cavity 136 throughout the front and the rear faces 131, 133 for receiving the second insulative housing 12.

The tongue plate 14 includes a free end 141 opposite to the base portion 13, a receiving opening 142 communicating with the receiving cavity 136, and a receiving base 143 between the free end 141 and the receiving opening 142. The receiving base 143 defines a plurality of parallel depressions 1431 communicating with the receiving opening 142, and then forms a plurality of projections 1432 located between the adjacent two depressions 1431. Each depression 1431 extends along the longitudinal direction A-A. Each projection 1432 extends into the receiving opening 142 for positioning the second insulative housing 12.

The second insulative housing 12 includes opposite first and second ends 121, 122, a plurality of openings 123 recessed from the first ends 121, and a plurality of second slits 124 recessed from the second ends 122. The second insulative housing 12 further defines a plurality of passageways 125 on opposite sides thereof for mounting the contacts 2.

As shown in FIGS. 6-9, the contacts 2 include a plurality of first contacts 21 and a plurality of second contacts 22. The first and the second contacts 21, 22 are disposed side by side along the transverse direction B-B. Each first contact 21 includes a first main portion 211, an elastic first contact portion 212 at one end of the first main portion 211, and a first bending portion 213 extending downwardly from the other end of the first main portion 211. The first main portion 211 has a certain width thereof and located in a horizontal plane. The other end of the first main portion 211 includes opposite lateral edges 214, 215 in the horizontal plane. The first bending portion 213 bends downwardly from one of the lateral edges 214, 215 and substantially perpendicular to the first main portion 211. The first bending portion 213 further includes a contractive first soldering portion 216 extending downwardly to be soldered to the PCB.

Each second contact 22 includes a second main portion 221, a stiff second contact portion 222 at one end of the second main portion 221, and it second bending portion 223 extending downwardly from the other end of the second main portion 221. The second main portion 221 is located in a horizontal plane. The other end of the second main portion 221 includes opposite lateral edges 224, 225 in the horizontal plane. The second bending portion 223 bends downwardly from one of the lateral edges 224, 225 and substantially perpendicular to the second main portion 221. The second bending portion 223 further includes a contractive second soldering portion 226 extending downwardly to be soldered to the PCB.

Figure 4:
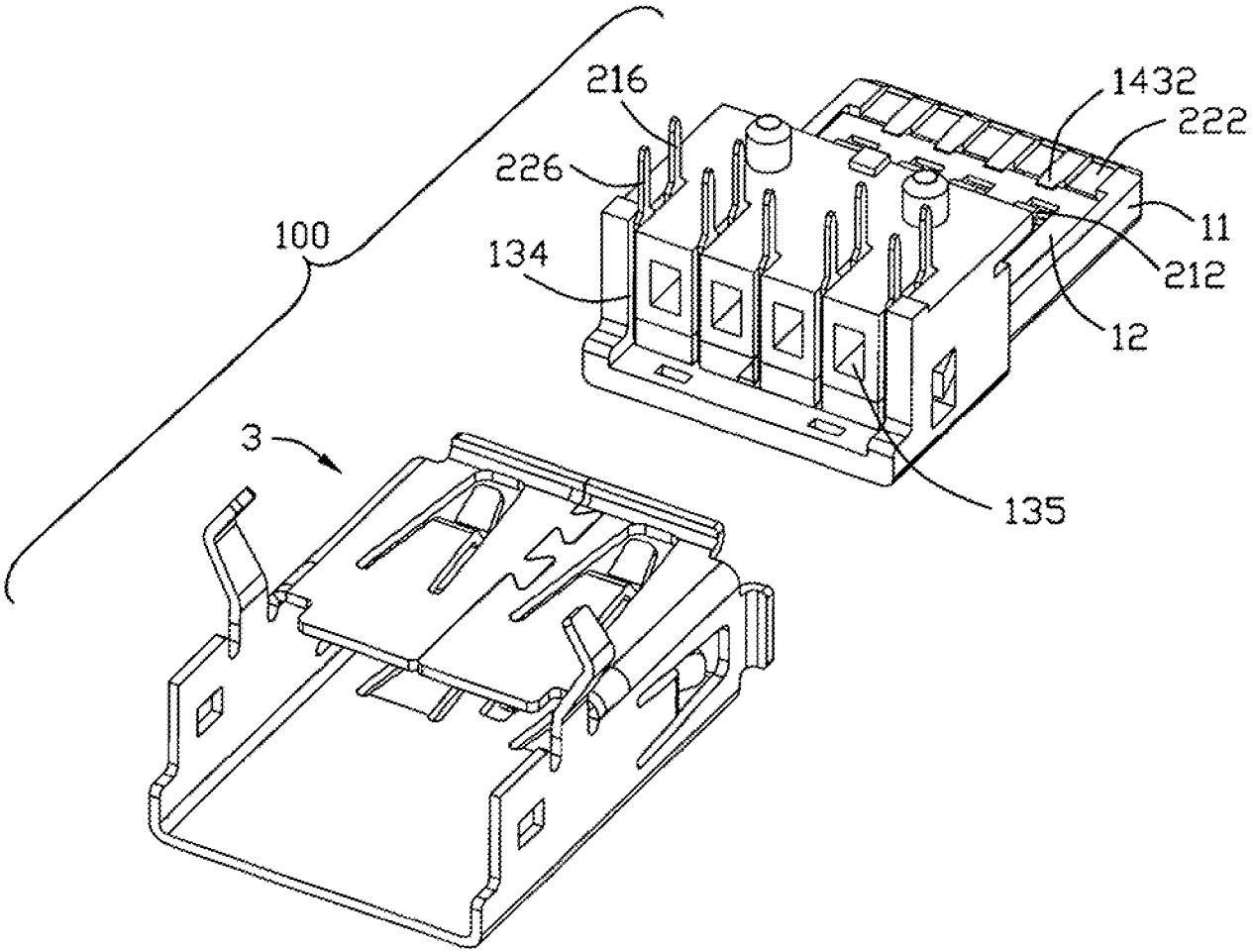
FIG. 4 is a part exploded perspective view of the electrical connector showing a metal shield disengaging from a housing member.
Figure 5:
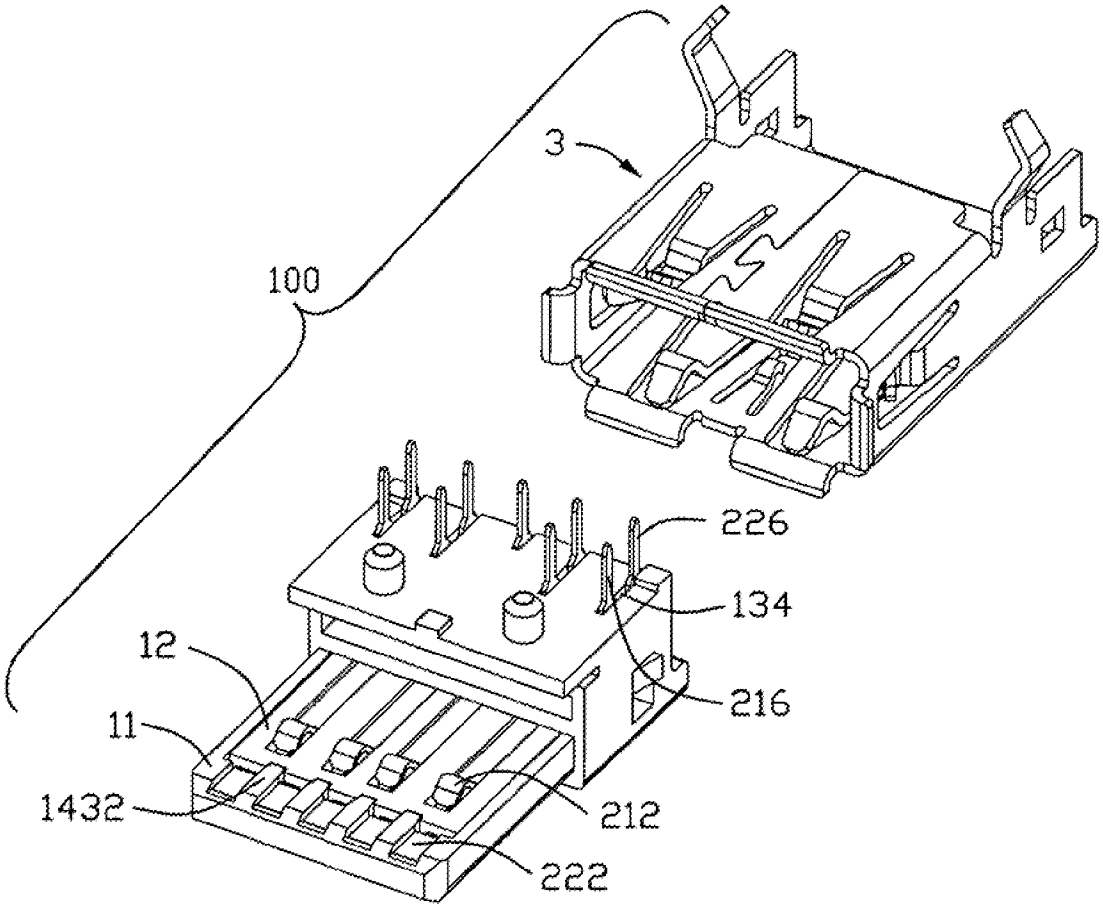
FIG. 5 is another part exploded perspective view of the electrical connector, while taken from another aspect.
Figure 8:
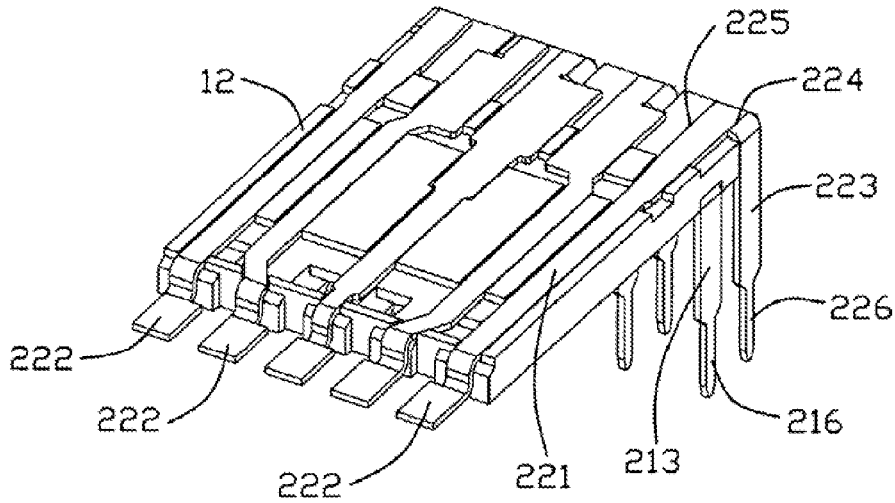
FIG. 8 is a perspective view of contacts assembled to a second insulative housing.

Referring to FIGS. 4, 5 and 8, in assembly, the first and the second contacts 21, 22 are attached to the second insulative housing 12 to form a module. The first and the second main portion 211, 221 are retained in the corresponding passageways 125 of the second insulative housing 12, and the some of the second bending portions 223 extend through the second slits 124 for preliminary positioning. The second contact portions 222 further extend beyond the second insulative housing 12. Then, the module is received in the receiving cavity 136 and the receiving opening 142 from a rear-to-front direction parallel to the longitudinal direction A-A. The second contact portions 222 are received in the corresponding depressions 1431 of the tongue plate 14. The first and the second contact portions 212, 222 are located at the same side of the housing member 1. The first contact portion 212 extend beyond the second insulative housing 12. The plurality of projections 1432 of the tongue plate 14 protrude into the corresponding openings 123 of the second insulative housing 12 as best shown in FIGS. 4 and 5. All the first and the second bending portions 213, 223 are received in the first slits 134 of the base portion 13. The first and the second bending portions 213, 223 which are received in the same first slit 134 aligned with each other along the longitudinal direction A-A.

Figure 3:
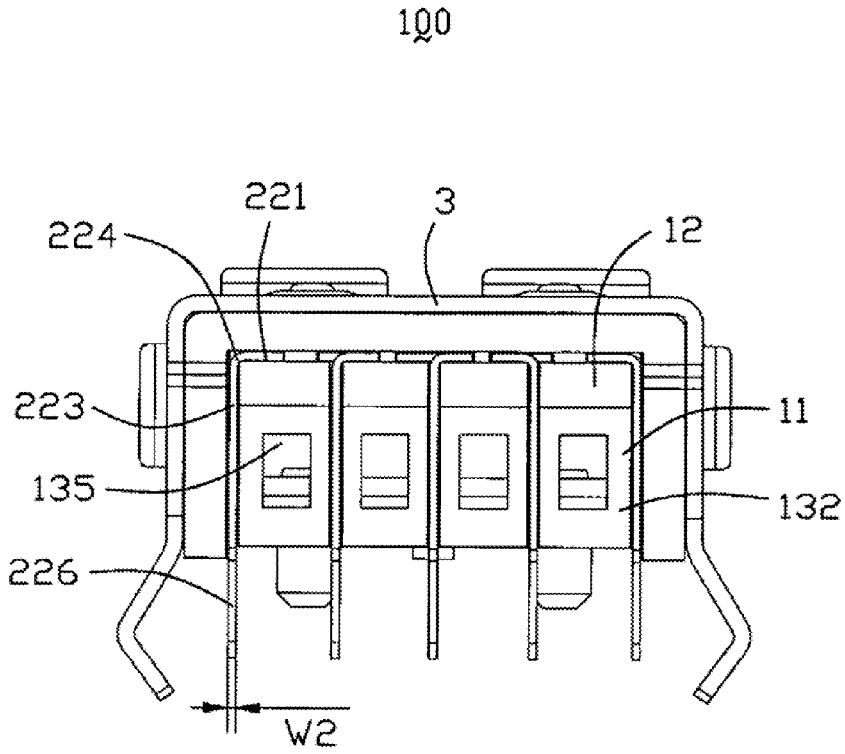
FIG. 3 is a perspective view of the electrical connector viewed from a rear-to-front direction.
Figure 9:
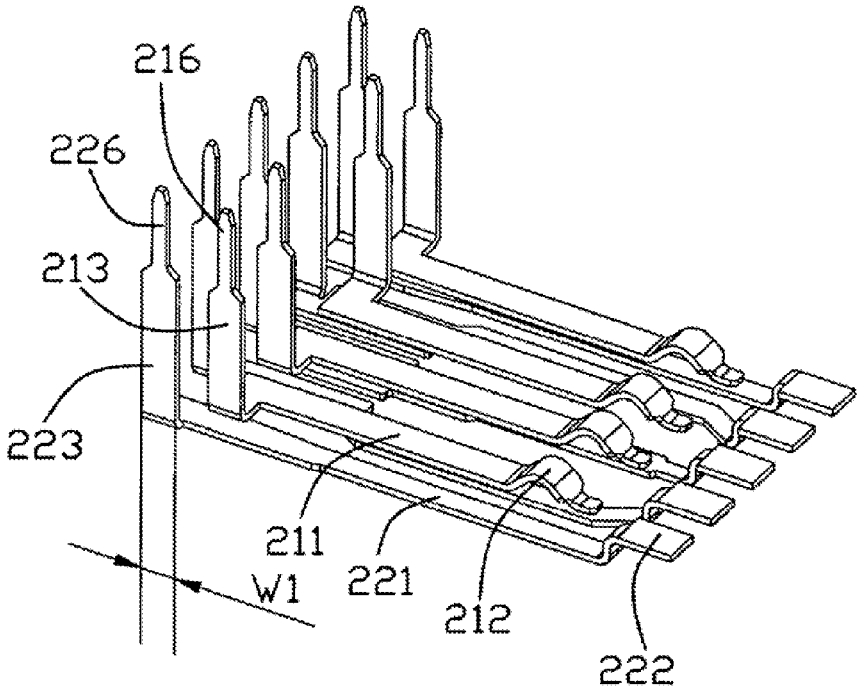
FIG. 9 is a perspective view of the contacts.

As shown in FIGS. 3 and 9, each first or second bending portion 213, 223 has a first width W1 viewed from a left-to-right direction parallel to the transverse direction B-B, and a second width W2 viewed from a rear-to-front direction parallel to the longitudinal direction A-A, wherein the second width W2 is much narrower than the first width W1. As a result, the first and the second bending portions 213, 223 occupy a small space of the rear side 132 of the first insulative housing 11 and left adequate space between the adjacent two second bending portions 223 for insertion of the fiber optic. The first and the second bending portions 213, 223 extend from a lateral edge of the corresponding first and the second main portions 211, 221. The first and the second soldering portions 216, 226 are parallel to each other and extend beyond the first and the second slits 134, 124 for being soldered to the PCB. The first and the second main portions 211, 221 are located in the horizontal plane, and the first and the second bending portions 213, 223 are located in the vertical plane.

Regarding FIGS. 1, 4 and 5, the metal shield 3 is in a tube shape, which defines a top face 31, a bottom face 32 opposite to the top face 31 and a pair of sidewalls 33 connecting the top face 31 and the bottom face 32. The metal shield 3 is secured to the base portion 13 of the first insulative housing 11 to enclose the tongue plate 14 and the second insulative housing 12 received in the receiving opening 142 of tongue plate 14. The metal shield 3 encloses the housing member 1 to form a receiving space 30 to which the first and the second contact portions 212, 222 exposed. The through holes 135 of the first insualtive housing 11 communicate with the receiving space 30 so that the fiber optic can be exposed to the receiving space 30 as well. Each of the top and bottom faces 31, 32 and the pair of sidewalls 33 include at least one spring arm 34 projecting into the receiving space 30 for abutting against the corresponding plug for retaining purpose.

Figure 10:
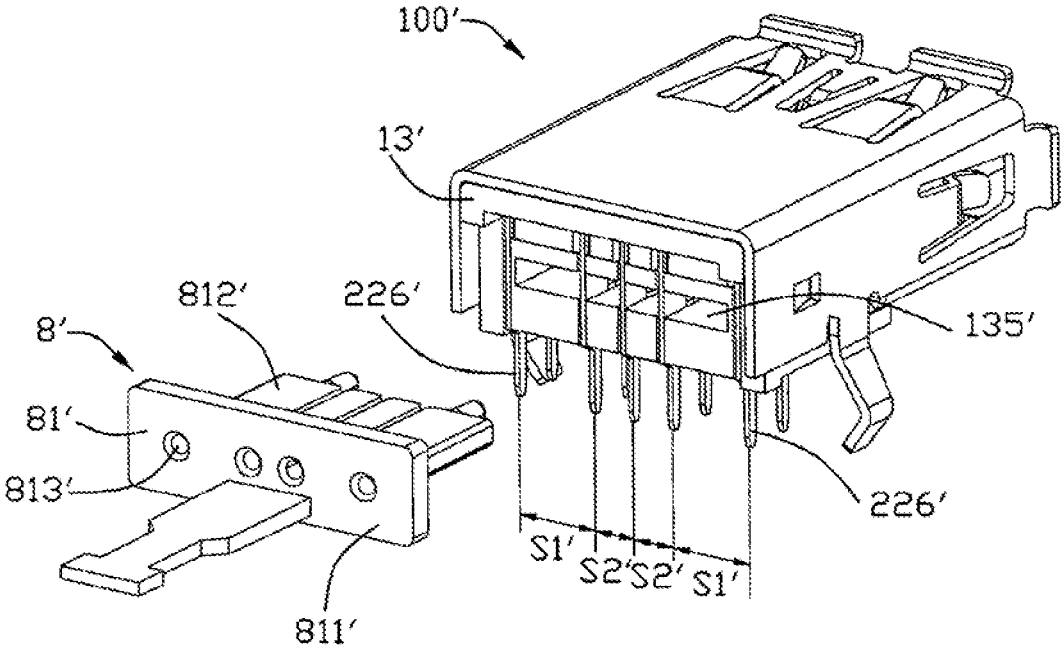
FIG. 10 is a perspective view of an electrical connector before insertion of a fiber optic device according to a second preferred embodiment of the present invention.
Figure 11:
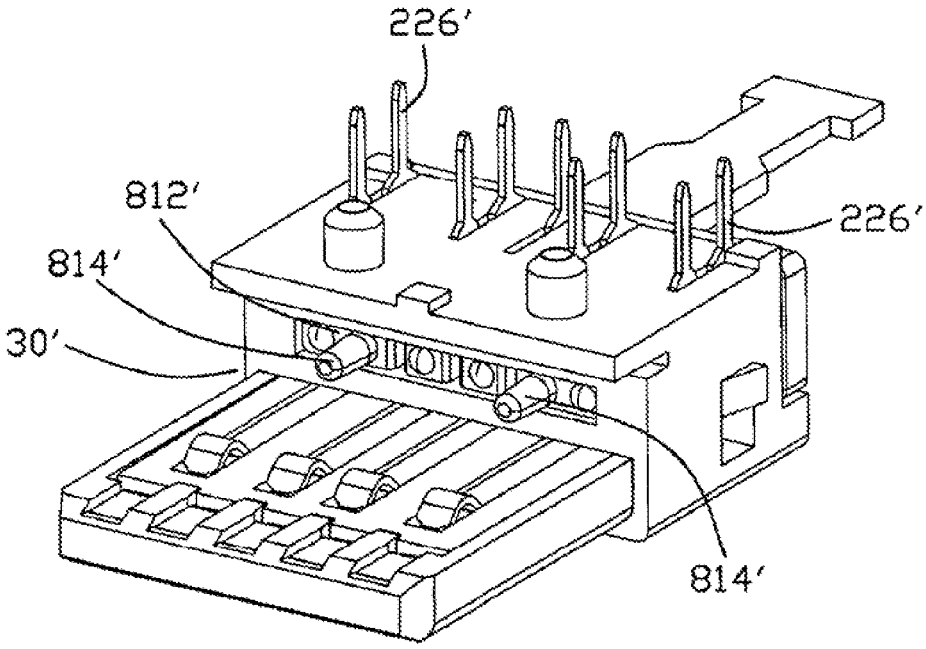
FIG. 11 is a perspective view of the electrical connector with insertion of the fiber optic device, while a metal shield thereof is removed.
Figure 12:
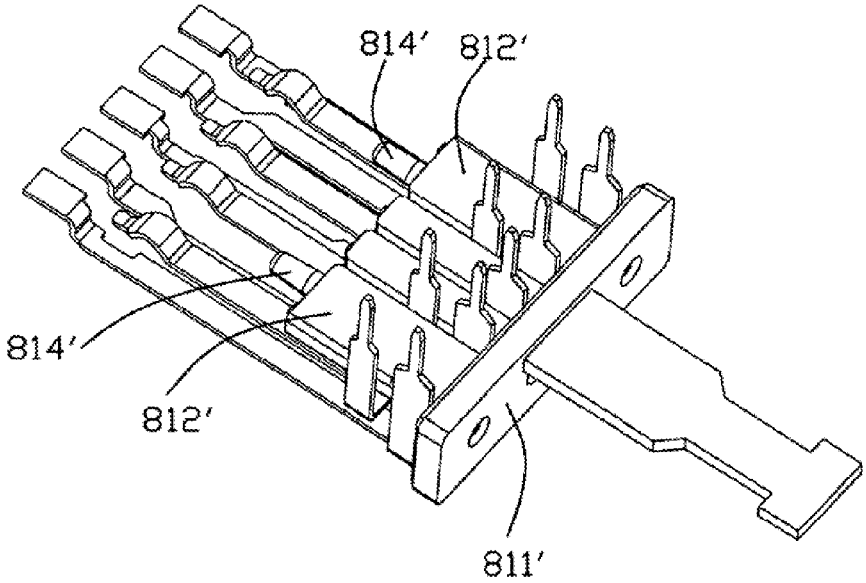
FIG. 12 is a perspective view of contacts assembled to a second insulative housing and with insertion of the fiber optic device.

Referring to FIGS. 10 to 12, another electrical connector 100' is disclosed according to a second embodiment of the present invention. The electrical connector 100' is similar to the electrical connector 100. The differences between them are that a space between each adjacent two second soldering portions 226 is almost the same, as best shown in FIG. 3, according to the first embodiment, while such space between the adjacent two second soldering portions 226' is not the same. In detail, two enlarged spaces S1' are formed between the adjacent two second soldering portions 226' on lateral sides of the base portion 13' with respect to a narrow space S2' between the adjacent two second soldering portions 226' which are located between the two enlarged spaces S1'. Referring to FIGS. 10 to 12, a fiber optic device 8' is received in the base portion 13'. The fiber optic device 8' includes an insulator 81' and a plurality of fiber cables (not shown) received in the insulator 81'. The insulator 81' includes a base 811' and four blocks 812' extending forwardly from the base 811'. In order to receive the fiber cables, each block 812' defines a hole 813' which further extends through the base 811'. The blocks 812' on lateral sides of the base portion 13' have a pair of guiding posts 814' as best shown in FIG. 11. In assembly, the insulator 81' is inserted into the base portion 13' through the corresponding through holes 135' in condition that the blocks 812' are received in the through holes 135' for positioning purpose. The guiding posts 814' extend into a receiving space 30' for mating with depressions of corresponding plugs (not shown). The fiber cables are inserted into the holes 813' for mating with the plug in order to enhance signal transmission. The fiber cables are electrically connected to a PCB on which the electrical connector 100' is mounted.

Figure 13:
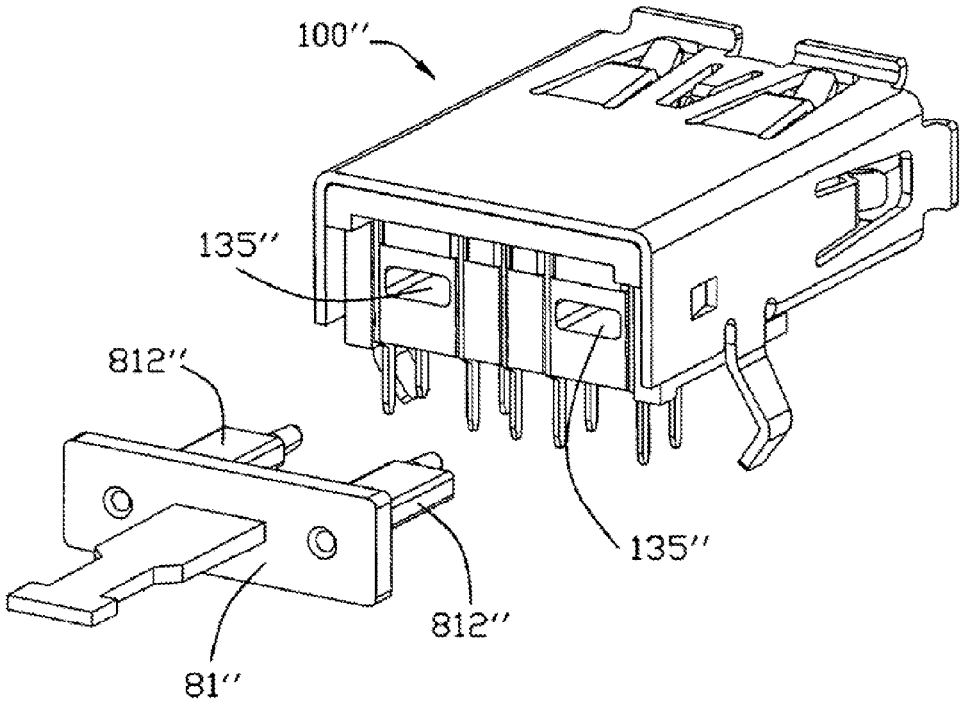
FIG. 13 is a perspective view of an electrical connector before insertion of a fiber optic device according to a third preferred embodiment of the present invention.
Figure 14:
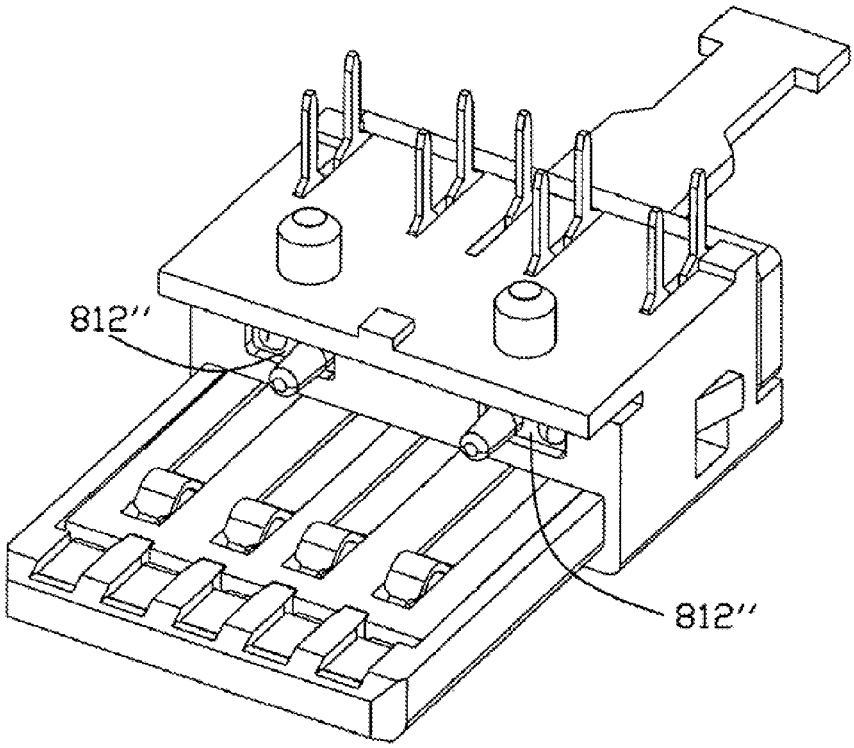
FIG. 14 is a perspective view of the electrical connector with insertion of the fiber optic device, while a metal shield thereof is removed.
Figure 15:
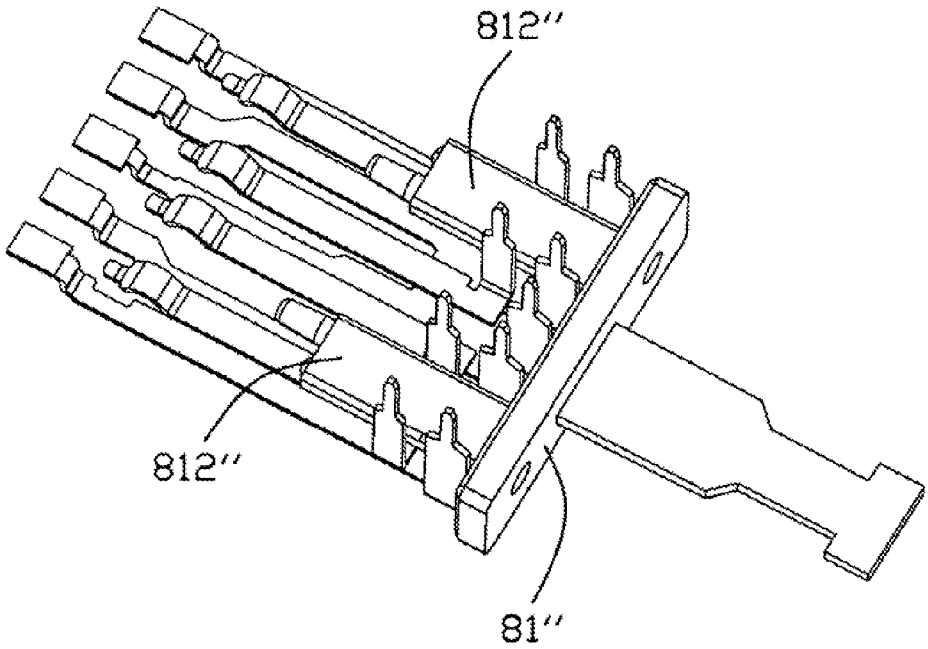
FIG. 15 is a perspective view of contacts assembled to a second insulative housing and with insertion of the fiber optic device.

Referring to FIGS. 13 to 15, an electrical connector 100" is disclosed according to a third embodiment of the present invention. The electrical connector 100" is similar to the electrical connector 100'. The differences between them are that the electrical connector 100" only defines two through holes 135" extending through a base portion 13" with respect to the four through holes 135'. Correspondingly, the insulator 81" only includes a pair of blocks 812" for being inserted into the through holes 135".

The electrical connectors 100, 100', 100" are compatible to the existing standard USB 2.0 plug which only has corresponding plug contacts for mating with the first contact portions 212. However, the plug with essentially shape of the standard USB 2.0 plug while with additional contacts for mating with the second contacts 22 and/or the fiber optic can also be received in the electrical connector 100 for high signal transmission.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, the tongue portion is extended in its length or is arranged on a reverse side thereof opposite to the supporting side with other contacts but still holding the contacts with an arrangement indicated by the broad general meaning of the terms in which the appended claims are expressed.

We claim:

1. An electrical connector, comprising:

a housing member;

a plurality of contacts attached to the housing member, the contacts comprising a plurality of first contacts arranged side by side along a transverse direction, and a plurality of second contacts arranged side by side along the transverse direction as well, each first contact comprising a first main portion, a first contact portion and a first bending portion extending from a lateral edge of the first main portion, the first bending portion being substantially perpendicular to the first main portion; each second contact comprising a second main portion, a second contact portion and a second bending portion extending from a lateral edge of the second main portion, the second bending portion being substantially perpendicular to the second main portion and being parallel to the first bending portion, the first and the second contact portions being located at a same side of the housing member, wherein each of the second bending portion comprises a first width viewed from a left-to-right direction parallel to the transverse direction, and a second width viewed from a rear-to-front direction perpendicular to the transverse direction in condition that the second width is narrower than the first width, wherein the electrical connector further comprises a metal shield enclosing the housing member to form a receiving space to which the first and the second contact portions exposed, the housing member defining a through hole communicating with the receiving space to receive a fiber optic device.

2. The electrical connector as claimed in claim 1, wherein the first contact portions are elastic and the second contact portions are stiff, the second contact portions being positioned at the front of the first contact portions along the rear-to-front direction.

3. The electrical connector as claimed in claim 1, wherein the first and the second main portions are mainly located in horizontal planes, and the first and the second bending portions are mainly located in vertical planes.

4. The electrical connector as claimed in claim 1, wherein each of the first contacts comprise a contractive first soldering portion extending downwardly from the first bending portion, and each of the second contacts comprise a contractive second soldering portion extending downwardly from the second bending portion, wherein the first and the second soldering portions are parallel to each other.

5. The electrical connector as claimed in claim 1, wherein the housing member defines a plurality of slits to position the first and the second bending portions, each first bending portion is aligned with the corresponding second bending portion along the rear-to-front direction so that they can be positioned in the same slit.

6. The electrical connector as claimed in claim 1, wherein the fiber optic device comprises a block received in the through hole, the block comprising a guiding post protruding into the receiving space.

7. The electrical connector as claimed in claim 1, wherein the housing member comprises a first insulative housing and a second insulative housing received in the first insulative housing.

8. The electrical connector as claimed in claim 7, wherein the first insulative housing comprises a base portion and tongue plate extending forwardly from the base portion, the tongue plate defining a receiving opening to receive the second insulative housing.

9. The electrical connector as claimed in claim 8, wherein the base portion defines a receiving cavity extending therethrough, the receiving cavity communicating with the receiving opening to wholly receive the second insulative housing.

10. The electrical connector as claimed in claim 8, wherein the tongue plate comprises at least one projection protruding into the receiving opening, the second insulative housing defining an opening on a front end thereof to receive the projection.

11. The electrical connector as claimed in claim 7, wherein the first and the second insulative housings both define a plurality of first and second slits to corporately receive the first and the second bending portions.

12. An electrical connector, comprising:

a housing member;

a plurality of contacts attached to the housing member, the contacts comprising a plurality of first contacts and a plurality of second contacts, each first contact comprising a first main portion, a first contact portion and a first bending portion, the first main portion being located in a horizontal plane and comprising opposite lateral edges, the first bending portion extending from one lateral edge of the first main portion and the first bending portion being substantially perpendicular to the first main portion; each second contact comprising a second main portion, a second contact portion and a second bending portion, the second main portion being located in another horizontal plane and comprising opposite lateral edges, the second bending portion extending from one lateral edge of the second main portion and the second bending portion being substantially perpendicular to the second main portion; wherein each first bending portion is aligned with the corresponding second bending portion along a rear-to-front direction, wherein the electrical connector further comprising a metal shield enclosing the housing member to form a receiving space to which the first and the second contact portions exposed, the housing member defining a through hole communicating with the receiving space to receive a fiber optic device.

13. The electrical connector as claimed in claim 12, wherein the housing member comprises a first insulative housing and a second insulative housing received in the first insulative housing, the first insulative housing comprising a base portion and tongue plate extending forwardly from the base portion, the tongue plate defining a receiving opening to receive the second insulative housing.

14. The electrical connector as claimed in claim 12, wherein all the second bending portions are arranged in a row perpendicular to the rear-to-front direction, two enlarged spaces being formed between the adjacent two second bending portions on lateral sides in the row with respect to a narrow space between the rest adjacent two second bending portions which are located between the two enlarged spaces.

*15. An electrical connector comprising:*

*a first insulative housing having a base with front face and rear face; a tongue portion extending forwardly from the front face of the base, the tongue portion having a receiving opening with a bottom and a receiving base defining a plurality of depressions, the depressions and the opening defined on a same side of the tongue portion;*

*a second insulative housing disposed within the receiving opening of the tongue portion and having a first surface and an opposite second surface;*

*a plurality of first contacts, each first contact having a first main portion, a first contact portion disposed on the first surface of the second insulative housing and a first tail portion extending beyond the base; and*

*a plurality of second contacts, each second contact having a second main portion, a second contact portion and a second tail portion extending beyond the base, the second main portion disposed on the second surface of the second insulative housing and located between the second insulative housing and the tongue portion, the second contact portions disposed within the depressions of the receiving base to be exposed.*

*16. The electrical connector as recited in claim 15, wherein the first contact portion is different to the second contact portion which is a blade-type contact.*

*17. The electrical connector as recited in claim 15, wherein the first contact portion and the second contact portion are offset from each other.*

*18. The electrical connector as recited in claim 17, wherein the first contact portion and the second main portions are located at different levels.*

*19. An electrical connector comprising:*

*a housing member having a first insulative housing and a second insulative housing, which are separated and engage with each other; and*

*a plurality of contacts attached to the housing member, the contacts comprising a plurality of first contacts arranged side by side along a transverse direction, each first contact comprising a first main portion and a first contact portion; and a plurality of second contacts arranged side by side along the transverse direction, each second contact comprising a second main portion and a second contact portion; wherein*

*the first and the second contact portions are exposed on a same side of the housing member along a longitudinal direction of the housing member that is perpendicular to the transverse direction and are arranged in two different rows along the transverse direction, respectively, the rows being offset from one another in the longitudinal direction; the first main portion of the first contacts are mounted to the second insulative housing, and at least one of the second main portion and the second contact portion of the second contact is attached to the first insulative housing.*

*20. An electrical connector as claimed in claim 19, wherein one of the first and the second insulative housing comprises a base and a tongue plate extending from the base and defining a receiving opening to receive the other insulative housing.*

*21. An electrical connector as claimed in claim 19, wherein the first contact portion of the first contact are elastic and the second contact portion of the second contact are stiff, and the first main portion and the second main portion are located in two different and parallel planes vertical to the longitudinal direction, respectively.*

*22. An electrical connector as claimed in claim 19, wherein the second main portion of the second contact are sandwiched by the first and the second insulative housings.*

*23. An electrical connector as claimed in claim 19, wherein the second main portions of the second contacts are mounted to the second insulative housing, and the second contacting portion are received in depressions defined on the first insulative housing.*

*24. An electrical connector as claimed in claim 19, further comprises a metal shield enclosing the housing member to*

*form a receiving space, both the side of the housing member disposed the first and the second contact portions and an opposite side of the housing member are exposed to the receiving space, both the first contacts and the second contacts are assembled to the housing member.*

*25. An electrical connector as claimed in claim 19, wherein the first contact portion of the first contact are exposed on a surface of the second insulative housing, and the second contact portions of the second contact are positioned by the first insulative housing.*

*26. An electrical connector comprising:*

*a metallic shell defining a mating port forwardly communicating with an exterior along a front-to-back direction for receiving a mating connector therein;*

*a first housing unit defining a tongue plate horizontally extending in the mating port and defining opposite first and second horizontal surfaces thereon in a vertical direction perpendicular to the front-to-back direction;*

*a receiving opening formed in the second horizontal surface;*

*a plurality of depressions formed in the second horizontal surface communicatively in front of the receiving opening;*

*a second housing unit having a portion which is snugly received in the receiving opening;*

*a plurality of still contacts each including a front flat contacting section received in the corresponding depression and exposed to the mating port in the vertical direction, a middle main section sandwiched between the second housing unit and the tongue plate in the vertical direction, and a rear tail section for mounting; and*

*a plurality of deflectable contacts each including a front deflectable resilient curved contacting section, and either the first housing unit or the second housing unit defining a plurality of passageways exposed to the mating port in the vertical direction around the second horizontal surface, the curved contacting section deflectable in the corresponding passageway in the vertical direction, a middle section and a rear tail section for mounting; wherein*

*the front flat contacting sections are located in front of the deflectable resilient curved contacting section.*

*27. The electrical receptacle connector as claimed in claim 26, wherein the deflectable contacts are retained to the second housing unit.*

*28. The electrical receptacle connector as claimed in claim 27, wherein the still contacts are retained to the second housing unit.*

*29. The electrical receptacle connector as claimed in claim 26, wherein the first housing unit and the second housing unit are configured to allow the second housing unit to be forwardly assembled to the first housing unit in the front-to-back direction.*

*30. The electrical receptacle connector as claimed in claim 26, wherein the first housing unit defines a base portion for mounting to the printed circuit board.*

*31. The electrical receptacle connector as claimed in claim 26, wherein the metallic shell is assembled to only the first housing unit.*

*32. The electrical receptacle connector as claimed in claim 26, wherein both of the first and the second horizontal surfaces of the first housing unit are exposed in the mating port.*

* * * * *